United States Patent [19]

Nakamura et al.

[11] Patent Number: 5,245,259
[45] Date of Patent: Sep. 14, 1993

[54] WIPER APPARATUS FOR MOTOR VEHICLE

[75] Inventors: Toyokazu Nakamura; Masaru Kato, both of Yokohama, Japan

[73] Assignee: Jidosha Denki Kogyo Kabushiki Kaisha, Yokohama, Japan

[21] Appl. No.: 966,837

[22] Filed: Oct. 27, 1992

[30] Foreign Application Priority Data

Nov. 6, 1991 [JP] Japan .................. 3-090812[U]

[51] Int. Cl.$^5$ ................................ B60S 1/08
[52] U.S. Cl. ........................ 318/443; 318/41; 318/445; 318/484
[58] Field of Search ............... 318/34, 35, 37, 41, 318/443, 444, 445, 484; 307/9.1, 10.1; 15/250.12, 250.17

[56] References Cited

U.S. PATENT DOCUMENTS

| | | | |
|---|---|---|---|
| 4,075,501 | 2/1978 | Kondo | 307/41 |
| 4,527,106 | 7/1985 | Fischer | 318/483 |
| 4,585,980 | 4/1986 | Gille et al. | 318/444 |
| 4,689,535 | 8/1987 | Tsunoda et al. | 318/443 |
| 4,689,536 | 8/1987 | Iyoda | 318/483 |
| 5,182,501 | 1/1993 | Henderson et al. | 318/443 |

Primary Examiner—Bentsu Ro
Attorney, Agent, or Firm—Sughrue, Mion, Zinn, Macpeak & Seas

[57] ABSTRACT

A wiper apparatus for wiping the windshield of a vehicle with a plurality of wiper blades operated by a plurality of wiper motors which comprises an intermittent switch, autostop switches disposed to the respective wiper motors, relays for operating the respective wiper motors in response to ON-states of the respective autostop switches, a relay driving circuit for driving the relays, a first timer circuit responsive to OFF-states of both the autostop switches for generating a first timer signal, a second timer circuit responsive to an intermittent signal from the intermittent switch and the ending edge of the first timer signal for generating a second timer signal, a third timer circuit responsive to an ON-state of either autostop switch for generating a third timer signal and holding the relay driving circuit to drive the relays, and a prohibiting circuit for forbidding and permitting the operation of the relay driving circuit according to the first timer signal and the second timer signal, respectively.

7 Claims, 5 Drawing Sheets

WIPER APPARATUS FOR MOTOR VEHICLE

BACKGROUND OF THE INVENTION

1. Field of the Invention

This invention relates to a wiper apparatus with wiper blades used for wiping raindrops and extraneous matters away from windshield and the like of, for example, a motor vehicle, and more particularly to a wiper controller which is possible to actuate a plurality of wiper blades synchronously by a plurality of wiper motors and possible to set a plurality of wiping operations at the time of an intermittent operation of the wiper blade.

2. Description of the Prior Art

Figure 5:
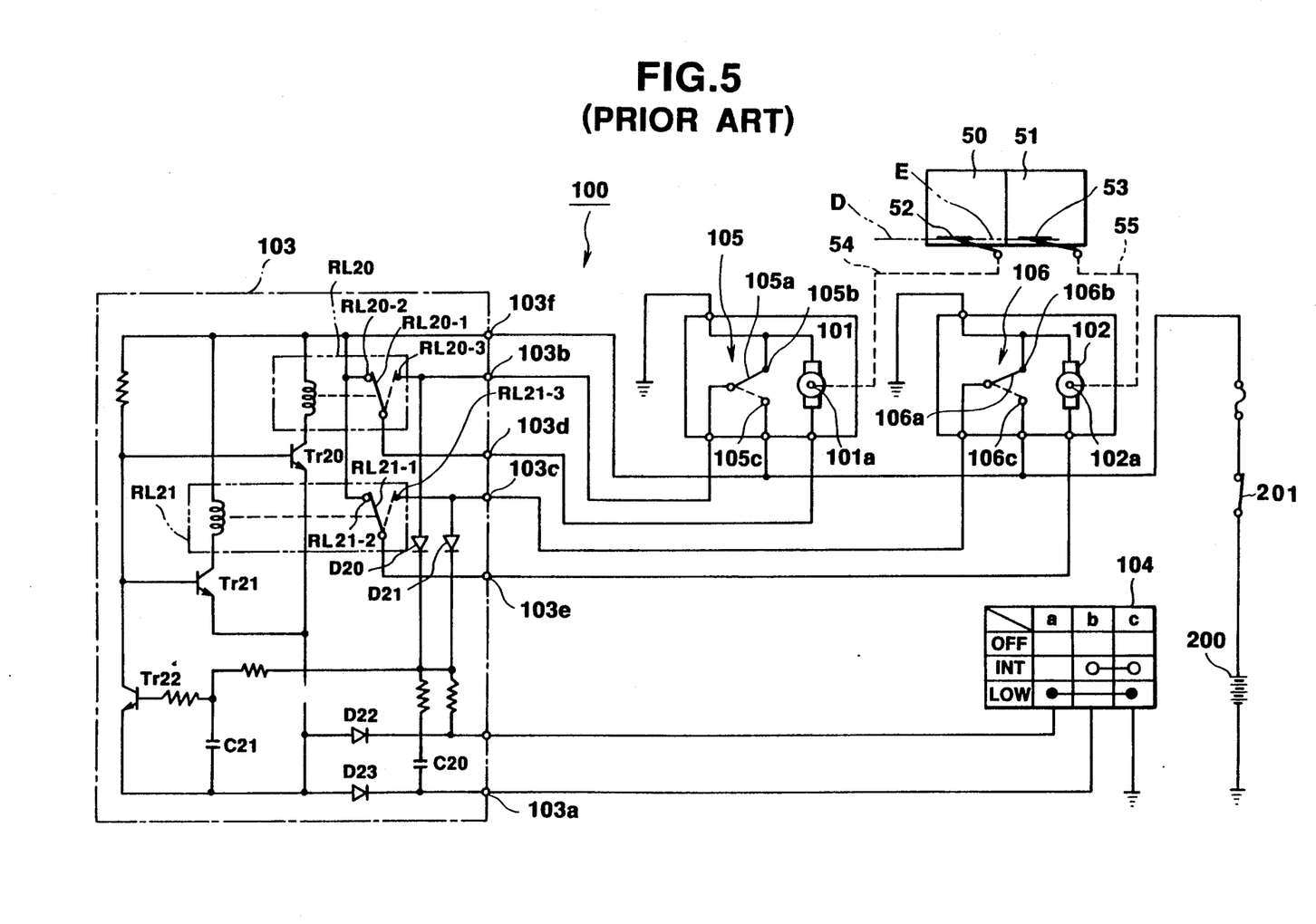
FIG. 5 is a circuit diagram of the conventional wiper apparatus.

Heretofore, there has been used a wiper apparatus shown in FIG. 5, for example.

A wiper apparatus 100 shown in the FIG. 5 comprises wiper motors 101 and 102 of which motor shafts 101a and 102a is connected through linkages 54 and 55 with wiper blades 52 and 53 to wipe window glasses 50 and 51 respectively; a controller 103 composed of relays RL20 and RL21, transistors Tr20, Tr21 and Tr22, capacitors C20 and C21, and diodes D20, D21, D22 and D23; and a wiper switch 104. And the wiper motors 101 and 102 are provided with autostop switches 105 and 106 linked with the motor shafts 101a and 102a, respectively, and movable contacts 105a and 106a of the autostop switches 105 and 106 are so structured as to come in contact with normal-closed fixed contacts 105b and 106b grounded when the wiper blades 52 and 53 are located in stop positions (lower turning positions) D and E on the window glasses 50 and 51, and so structured as to come contact with normal-opened fixed contacts 105c and 106c connected to a power source 200 through an ignition switch 201 when the wiper blades 52 and 53 are located out of the stop positions D and E.

By switching on the ignition switch 201, H-level potential is applied to the bases of the transistors Tr20 and Tr21. And by changing the wiper switch 104 into a INT position (intermittent mode), a terminal 103a of the controller 103 is grounded, so that the relays RL20 and RL21 work and traveling contacts RL20-1 and RL21-1 shift from normal-closed contacts RL20-3 and RL21-3 to normal-opened contacts RL20-2 and RL21-2, respectively as shown in the figure with solid lines.

Whereby, an electric current flows from the power source 200 to the motors 101 through a terminal 103f of the controller 103, the normal-opened relay contact RL20-2, the traveling contact RL20-1 and a terminal 103d of the controller 103, and flows to the motor 102 from the power source 200 through the terminal 103f, the normal-opened relay contact RL21-2, the traveling contact RL21-1 and a terminal 103e of the controller 103, so that the motors 101 and 102 start their rotation.

When the respective wiper blades 52 and 53 depart from the stop positions D and D, the movable contacts 105a and 106a of the autostop switches 105 and 106 come in contact with the normal-opened fixed contacts 105c and 106c. Therefore, an electric current flows from the power source 200 to earth through the normal-opened fixed contact 105c of the autostop switch 105, the movable contact 105a, a terminal 103b of the controller 103, the diode D20, the capacitor C20, the terminal 103a of the controller 103 and the wiper switch 104, and through the normal-opened fixed contact 106c of the autostop switch 106, the movable contact 106a, a terminal 103c of the controller 103, the diode D21, the capacitor C21, the diode D23, the terminal 103a of the controller 103 and the wiper switch 104, thereby applying H-level potential to the base of the transistor Tr22 after charging the capacitors C20 and C21, so that the transistor Tr22 is turned on, and the transistors Tr20 and Tr21 are turned off. And the traveling contacts RL20-1 and RL21-1 of the relay RL20 and RL21 shift from the normal-opened contacts RL20-2 and RL21-2 to the normal-closed contact RL20-3 and RL21-3, respectively as shown in the figure with broken lines.

Accordingly, the wiper motors 101 and 102 continue to actuate the wiper blades 52 and 53 because an electric current flows from the power source 200 to the motors 101 and 102 through the normal-opened fixed contact 105c of the autostop switch 105, the movable contact 105a, the terminal 103b of the controller 103, the normal-closed contact RL20-3 of the relay RL20, the traveling contact RL20-1 and the terminal 103d of the controller 103, and through the normal-opened fixed contact 106c of the autostop switch 106, the movable contact 106a, the terminal 103c of the controller 103, the normal-closed contact RL21-3 of the relay RL21, the traveling contact RL21-1 and the terminal 103e of the controller 103.

When the respective wiper blade 52 and 53 arrive at the stop positions D and E after reciprocating on the respective window glasses 50 and 51, the movable contacts 105a and 106a of the autostop switch 105 and 106 shift to the normal-closed fixed contacts 105b and 106b, whereby the potential level at the terminals 103b and 103c of the controller 103 become low, but the transistor Tr22 is maintained in an ON-state since the H-level potential is applied to the base of the transistor Tr22 from the capacitors C20 and C21. Accordingly, the transistors Tr20 and Tr21 are kept in their OFF-states, the traveling contacts RL20-1 and RL21-1 of the relays RL20 and RL21 remain at the normal-closed relay contacts RL20-3 and RL21-3, thereby stopping the rotation of the motors 101 and 102.

The wiper motors 101 and 102 stop while the capacitors C20 and C21 are discharged, and the wiper blades 52 and 53 remain at their stop positions D and E, thereby setting intermittent time.

When the H-level potential ceases to be applied to the base of the transistor Tr22 after discharge of the capacitors C20 and C21, the transistor Tr22 is turned off and, the transistors Tr20 and Tr22 change to ON-states and excite relay coils of the relays RL20 and RL21, so that the traveling contacts RL20-1 and RL21-1 shift to the normal-opened relay contacts RL20-2 and RL21-2 as shown in figure with solid lines, and the wiper motor 101 and 102 start the rotation again.

In this time, for example, even if the wiper blade 52 arrives and stops at the stop position D, and the movable contact 105a of the autostop switch 105 disposed to the wiper motor 101 comes in contact with the normal-closed fixed contact 105b before the other wiper blade 53 arrives at the stop position E, the transistor Tr22 is maintained in the ON-state since the movable contact 106a of the autostop switch 106 disposed to the other wiper motor 102 is in contact with the normal-opened fixed contact 106c, the rotation of the wiper motor 102 continues until the wiper blade 53 arrives at the stop position E. In such a manner, the swinging motions of the wiper blade 52 and 53 are synchronized with each other.

In a case of changing the wiper switch 104 into a LOW position (low mode), the base of the transistor Tr22 is grounded and the transistors Tr20 and Tr21 are in the ON-state continually, and so the wiper motors 101 and 102 actuate the wiper blades 52 and 53 continuously regardless of the positions of the movable contacts 105a and 106a of the autostop switches 105 and 106 because the traveling contacts RL20-1 and RL21-1 are in contact with the normal-opened contacts RL20-2 and RL21-2 of the relays RL20 and RL21 as shown in the figure with solid lines at all times.

However, in the afore-mentioned conventional wiper apparatus 100 so structured as to stop the wiper motors 101 and 102 for an intermittent time depending on capacities of the capacitors C20 and C21 when the respective wiper blades 52 and 53 arrive at the stop positions D and E after reciprocating only one time on the window glasses 50 and 51, there is a problem in that raindrops and extraneous matters remain on the window glasses 50 and 51 and obstruct the view from the driver's seat pending the intermittent time of the wiper blades, thereby causing an obstruction to the driving of the motor vehicle in a case in which the intermittent mode of the wiper apparatus is selected in spite that the raindrops and the extraneous matters are attached on the window glasses 50 and 51 in large quantity.

SUMMARY OF THE INVENTION

This invention is made in view of the above mentioned problem of the conventional wiper apparatus, and it is an object to provide a wiper apparatus which is possible to obtain a wide range of view even if the intermittent mode is selected in the case where the window glass is attached with raindrops and extraneous matters in large quantity comparatively.

The construction of this invention in order to accomplish the above mentioned object is characterized in that a wiper apparatus for wiping on the windshield of a vehicle with a plurality of wiper motors and a plurality of wiper blades operated by the wiper motors comprises intermittent switch means for generating an intermittent signal, a first wiper motor having a first cooperating switch operated with rotation thereof, a second wiper motor having a second cooperating switch operated with rotation thereof, a first relay connected with the first wiper motor and the first cooperating switch of the first wiper motor for operating the first wiper motor while the first cooperating switch of the first wiper motor is in an ON-state, a second relay connected with the second wiper motor and the second cooperating switch of the second wiper motor for operating the second wiper motor while the second cooperating switch of the second wiper motor is in an ON-state, relay driving means connected with the first and second relays and the first and second cooperating switches of the first and second wiper motors for driving the first and second relays, first timer means connected with the first and second cooperating switches of the first and second wiper motors and responsive to OFF-states of the first and second cooperating switches of the first and second wiper motors for generating a first timer signal with a predetermined time duration of intermittent time (T1), second timer means connected with the intermittent switch means, the first timer means and the first and second cooperating switches of said first and second wiper motors and responsive to the intermittent signal generated from the intermittent switch means, the ending edge of the first timer signal of the first timer means and states of the first and second cooperating switches of the first and second wiper motors for generating a second timer signal a time duration (T2:T2<T1) of which is determined longer than time required for the wiper blade to go and return back, the second timer means counting up in response to the OFF-states of the first and second cooperating switches of the first and second wiper motors and counting down in response to an ON-state of either first or second cooperating switch of the first or second wiper motor, third timer means connected with the first and second cooperating switches of the first and second wiper motors and responsive to the ON-state of either first or second cooperating switch of the first or second wiper motor for generating a third timer signal with predetermined time duration (T3:T3<T2), the third timer means being connected with the relay driving means for holding the relay driving means in operating condition during the time duration (T3), and prohibiting means connected with the first and second timer means and the relay driving means for forbidding the operation of the relay driving means while the first timer signal generated in the first timer means is supplied thereto and for permitting the operation of the relay driving means while the second timer signal generated in the second timer means is supplied thereto. And in a preferred aspect according to this invention, the wiper apparatus may further comprise washer switch means for generating a washer signal, a washer motor connected to the washer switch means, a delaying circuit connected to the washer switch means and the prohibiting means, and responsive to the washer signal from the washer switch means for generating a delayed washer signal and for supplying the delayed washer signal to the prohibiting means to permit the operation of the relay driving means, and fourth timer means connected with the washer switch means and the first and second cooperating switches of the first and second wiper motors, and responsive to the ending edge of the washer signal generated from the washer switch means and states of the first and second cooperating switches of the first and second wiper motors for generating a fourth timer signal with predetermined duration time (T4:T2≦T4<T1) and for supplying the fourth timer signal to the prohibiting means to permit the operation of the relay driving means, the fourth timer means counting up in response to the OFF-states of the first and second cooperating switches of the first and second wiper motors and counting down in response to the ON-state of either first or second cooperating switch of the first or second wiper motor.

DESCRIPTION OF THE PREFERRED EMBODIMENT

An embodiment of the wiper apparatus according to this invention will be explained below on basis of FIG. 1 to FIG. 4.

Figure 1:
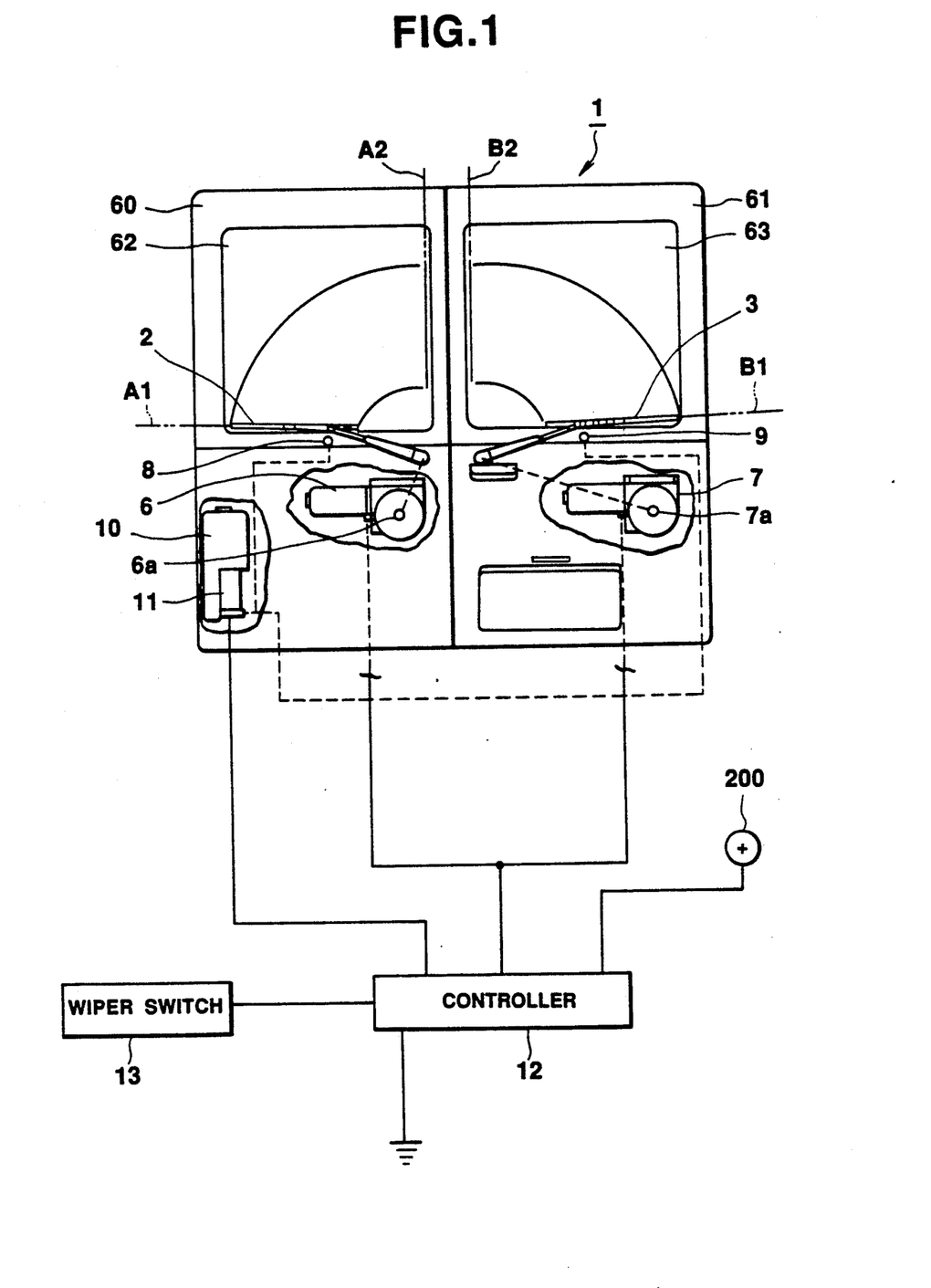
FIG. 1 is a schematic diagram showing the wiper apparatus according to an embodiment of this invention.

Namely, a wiper apparatus 1 is provided with wiper blades 2 and 3 for wiping two window glasses 62 and 63 between stop positions A1, B1 (lower turning positions) and upper turning positions A2, B2 of rear doors 60 and 61, and wiper motors 6 and 7 of which motor shafts 6a and 7a are connected to the respective wiper blades 2 and 3 through linkages, further provided with a washer motor 11 for spraying washing fluid stored in a reservoir 10 toward the window glasses 62 and 63 through nozzles 8 and 9, respectively.

The wiper motors 6 and 7, and the washer motor 11 are connected to a controller 12, which is grounded and connected with a wiper switch 13 having an intermittent switch and washer switch and operable to select operational modes of the wiper apparatus, and a power source terminal 200.

Figure 2:
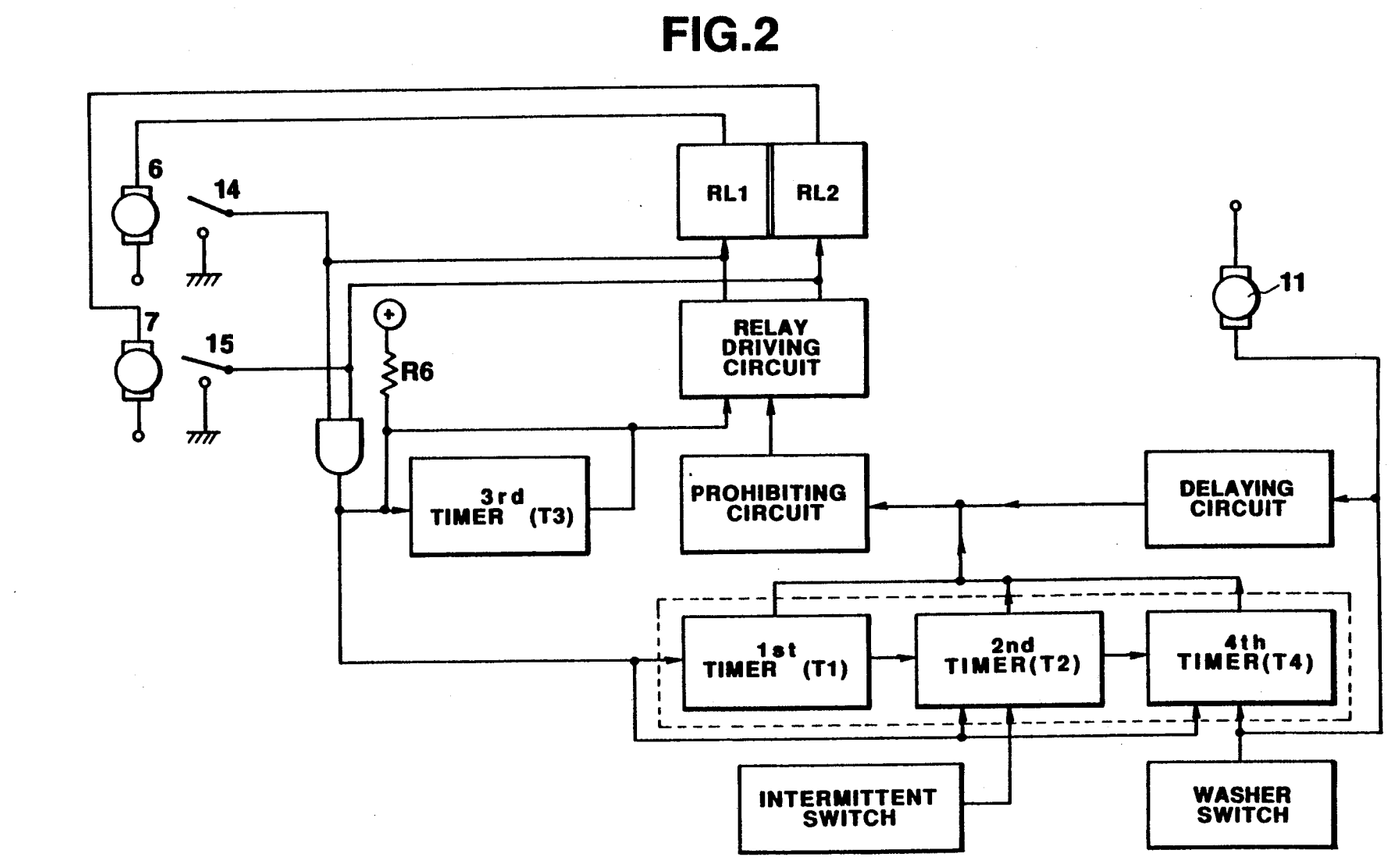
FIG. 2 is a functional block diagram of the wiper apparatus shown in FIG. 1.
Figure 3:
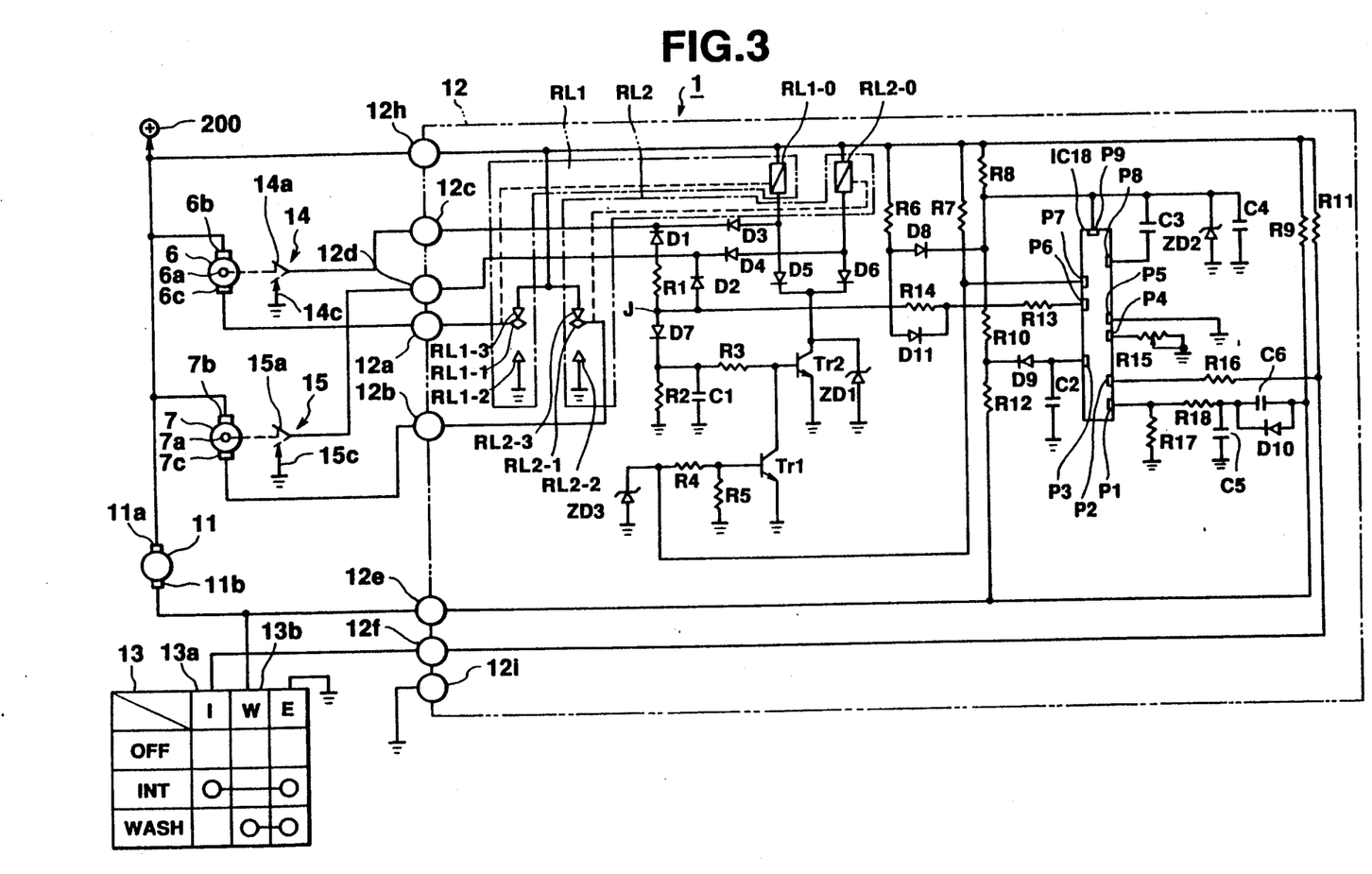
FIG. 3 is a circuit diagram of the wiper apparatus shown in FIG. 1.

The wiper motor 6 and 7 are disposed with autostop switches 14 and 15 having movable contacts 14a and 15a linked with the respective motor shafts 6a and 7a as shown in FIG. 2 and FIG. 3, and so designed that the movable contacts 14a and 15a change into opened state (H-level potential) when the wiper blades 2 and 3 are in the stop positions A1 and B1, and they come in contact with the grounded normal-opened fixed contacts 14c and 15c (L-level potential) when the wiper blades 2 and 3 are out of the stop positions A1 and B1.

Terminals 6b and 7b of the wiper motors 6 and 7 are connected to a power source terminal 200, terminals 6c and 7c of the wiper motors 6 and 7 are connected to wiper motor terminals 12a and 12b of the controller 12, and the movable contacts 14a and 15a of the autostop switches 14 and 15 are connected to autostop switch terminals 12c and 12d of the controller 12.

A terminal 11a of the washer motor 11 is also connected to the power source terminal 200 and a brush terminal 11b of the washer motor 11 is connected to a washer motor terminal 12e of the controller 12.

An intermittent terminal 13a of the wiper switch 13 is connected to an intermittent wiper switch terminal 12f, and a washer terminal 13b of the wiper switch 13 is connected to the washer motor terminal 12e of the controller 12.

Furthermore, a power terminal 12h of the controller 12 is connected to the power source terminal 200 and an earth terminal 12i of the controller 12 is grounded.

On the other side, the controller 12 is composed of relays RL1 and RL2, an integrated circuit IC18 having ports P1 to P9, resistors R1 to R18, capacitors C1 to C6, diodes D1 to D11, zenor diodes ZD1 to ZD3, and transistors Tr1 and Tr2.

The relay RL1 is connected with the wiper motor 6 and the autostop switch 14, the relay RL2 is connected with the wiper motor 7 and the autostop switch 15, and the relays RL1 and RL2 are so designed as to actuate the wiper motors 6 and 7 when the movable contacts 14a and 15a come in contact with the fixed contacts 14c and 15c of the autostop switch 14 and 14, respectively.

The port P1 of the integrated circuit IC18 is an input port for a washer signal, the port P2 of the integrated circuit IC18 is an input port for setting intermittent time, and the port P3 of the integrated circuit IC18 is an input port for terminal voltage of the capacitor C2, an output level from the port P7 is so designed as to be L-level when the terminal voltage of the capacitor C2 becomes higher than the first threshold level and so designed as to be H-level when the terminal voltage of the capacitor C2 becomes lower than the second threshold level which is lower than the first threshold level according to charge and discharge of the capacitor C2.

The port P4 of the integrated circuit IC18 is a charging time setting port for setting time required for charging the capacitor C2, the port P5 is a port to be grounded, and the port P6 of the integrated circuit IC18 is a switching port for starting the charge and the discharge of the capacitor C2 and so designed as to discharge the capacitor C2 when electric potential at the port P6 is L-level, and to charge the capacitor C2 when the electric potential of the port P6 is H-level.

In addition, the port P7 of the integrated circuit IC18 is an output port, the port P8 of the integrated circuit IC18 is an anti-malfunction port for preventing an error signal to be output from the port 7 by mistake in a case in which a signal input from the port P1 or P2 is chattering by some reason, and the port P9 is a port for the power source.

The controller 12 is provided with a relay driving circuit for driving the relays RL1 and RL2, a first timer circuit for generating a first timer signal with a predetermined time duration (T1) when both the wiper blades 2 and 3 arrive and stop at the stop position A1 and B1, a second timer circuit for generating a second timer signal with a time duration (T2) predetermined longer than time necessary for the wiper blades 2 and 3 to go and return back in response to generation of an intermittent signal from the intermittent switch of the wiper switch 13 and disappearance of the first timer signal from the first timer circuit, a third timer circuit for generating a third timer signal with a predetermined time duration (T3) and holding the relay driving circuit in operating condition during the time duration (T3) when either of the wiper blade 2 or 3 departs from the stop position A1 or B1, a prohibiting circuit for forbidding and permitting the operation of the relay driving circuit in response to the first timer signal and the second timer signal respectively, a delaying circuit for generating a delayed washer signal and permitting the operation of the relay driving circuit through the prohibiting circuit in response to a washer signal from the washer switch of the wiper switch 13, and a fourth timer circuit for generating a fourth timer signal with a predetermined time duration (T4) and permitting the operation of the relay driving circuit through the prohibiting circuit in response to disappearance of the washer signal from the washer switch of the wiper switch 13.

The relay driving circuit is composed of the diodes D5 and D6 connected to respective relay coils RL1-0 and RL2-0 of the relays RL1 and RL2, the transistor Tr2 and the zenor diode ZD1.

The first timer circuit, the second timer circuit and the fourth timer circuit are commonly composed of the capacitor C2 connected to the port P3 of the integrated circuit IC18 and the variable resistor R15 connected to the port P4 of the integrated circuit IC18, and the first timer circuit defines the intermittent time (T1) of the wiper blades 2 and 3 according to the time required for charging the capacitor C2 up to the predetermined first threshold level after changing electric potentials of the movable contacts 14a and 15a of the autostop switches 14 and 15 into H-level at a case in which the transistor Tr1 forming a part of the prohibiting circuit is in its ON-state.

The second timer circuit defines the time for actuating the wiper blades 2 and 3 for two times according to the amount of time the transistor Tr1 of the prohibiting circuit connected to the port P7 of the integrated circuit IC18 is held in the ON-state.

The third timer circuit is composed of the diode D1, the resistor R1, the diode D2 and D7 which are connected to the movable contacts 14a and 15a of the autostop switch 14 and 15 through autostop switch terminals 12c and 12d of the controller 12, and time constant means formed of the resistors R2 and R3, and the capacitor C1. The third timer circuit defines the time for keeping the operation of the relay RL1 and RL2 by maintaining the transistor Tr2 in the ON-state until the movable contacts 14a and 15a of the autostop switches 14 and 15 disposed on the wiper motors 6 and 7 are grounded after the wiper blades 2 and 3 start synchronously to wipe the window glasses 62 and 63 and either the wiper blade 2 or 3 departs from the stop position A1 or B1 according to the time required for the condenser C1 to be discharged after either the movable contact 14a or 15a of the autostop switch 14 or 15 is grounded.

The fourth timer circuit is so designed that electric potential at the washer motor terminal 12e of the controller 12 changes into L-level when the wiper switch 13 is switched into a washer position (WASH), and electric potential at the port P1 of the integrated circuit IC18 changes into L-level after predetermined time by the delaying circuit composed of the capacitor C5 and the resistors R17 and R18, thereby changing electric potential at the port P7 of the integrated circuit IC18 into L-level. And the fourth timer circuit maintains electric potential at the port P3 of the integrated circuit IC18 in H-level while the wiper switch 13 is kept in the washer position (WASH), and defines the time for maintaining the wiping operation of the respective wiper blades 2 and 3 according to the time required for discharging the capacitor C2 by changing the electric potential at the port P1 of the integrated circuit IC18 into H-level and changing the port P3 into the L-level potential when the wiper switch 13 is switched off from the washer position (WASH).

The prohibiting circuit is composed of the resistor R4 and R5, the zenor diode ZD3 and the transistor Tr1, which are connected to the port P7 of the integrated circuit IC18 and connected with the first, second and fourth timer circuits through the integrated circuit IC18. Furthermore, the collector of the transistor Tr1 is connected to the base of the transistor Tr2 in the relay driving circuit.

An explanation will be given below about the working of the wiper apparatus 1 on basis of the circuit diagram shown in FIG. 3 and the time chart shown in FIG. 4.

First of all, in a case of switching the ignition switch (not shown) on, an electric current is supplied to the power source terminal 200 and the capacitor C2 connected to the port P3 of the integrated circuit IC18 is charged and by switching the wiper switch 13 into an intermittent position (INT) at time t1 electric potential at the port P2 of the integrated circuit IC18 changes to L-level, the electric potential at the port P7 of the integrated circuit IC18 changes into the L-level, thereby turning the transistor Tr1 off, because electric potential of the capacitor C2 connected to the port P3 of the integrated circuit IC18 is H-level.

In this case, the wiper blades 2 and 3 are in the stop positions A1 and B1, respectively and the movable contacts 14a and 15a of the autostop switches 14 and 15 are not grounded through the normal-opened fixed contacts 14c and 15c, and so electric potential at the autostop switch terminals 12c and 12d of the controller 12 are H-level, respectively. Therefore, an electric current from the power source terminal 200 is applied to the resistor R2 and the capacitor C1 through the terminal 12h of the controller 12, the resistor R6, a node J and the diode D7, and applied to the base of the transistor Tr2 through the resistor R3, thereby charging the capacitor C1 at time t1 and turning the transistor Tr2 at the same time substantially. In this time, the electric potential at the port P3 of the integrated circuit IC18 is maintained in the H-level and the charge of the capacitor C2 is continued since the electric potential at the autostop switch terminals 12c and 12d are H-level and so the port P6 of the integrated circuit IC18 is also maintained in H-level potential.

According to the ON-working of the transistor Tr2, relay coil RL1-0 and RL2-0 of the relays RL1 and RL2 are excited and traveling contacts RL1-1 and RL2-1 come in contact with grounded fixed contacts RL1-2 and RL2-2, thereby grounding the wiper motor terminals 12a and 12b of the controller 12 and the wiper motors 6 and 7 start their rotation at time t1.

When the rotation of the wiper motor 6 and 7 are beginning, either of the wiper blade 2 or 3 departs from the stop position A1 or B1 and either of the movable contact 14a or 15a of the autostop switch 14 or 15 comes in contact with the normal-opened fixed contact 14c or 15c which is grounded at time t2, either of electric potential at the autostop switch contact 12c or 12d of the controller 12 changes into L-level (in FIG. 4, a case is exemplified that the wiper blade 2 departs from the stop position A1 before the wiper blade 3 departs from the stop position B1 and the electric potential at the autostop switch terminal 12c changes into L-level previously to the autostop switch terminal 12d of the controller 12) and the capacitor C1 begins to discharge. In this time, the electric potential at the port P3 of the integrated circuit IC18 changes also into L-level thereby making the electric potential at the port P3 into L-level and the capacitor C2 also starts discharging.

Then, when the both wiper blades 2 and 3 depart from the respective stop positions A1 and B1, and the movable contacts 14a and 15a of the autostop switches 14 and 15 come in contact with the grounded normal-open fixed contacts 14c and 15c at time t2 and t3 respectively, so that both the electric potential of the movable contacts 14a and 15a change into L-level and the capacitor C1 discharges down to the predetermined electric potential, the transistor Tr2 of the relay driving circuit is turned off at time t4.

By the contact of the movable contacts 14a and 15a with the grounded normal-opened fixed contacts 14c and 15c of the autostop switches 14 and 15 at time t2 and t3, the movable contacts 14a and 15a form grounding circuits grounding the relay coils RL1-0 and RL2-0 of the relays RL1 and RL2 through the diodes D3 and D4 instead of the transistor Tr2, therefore the traveling contacts RL1-1 and RL2-1 are kept being in contact with the grounded fixed relay contacts RL1-2 and RL2-2 in spite of the OFF-state of the transistor Tr2, the wiper motor terminals 12a and 12b of the controller 12 are maintained to be grounded, and the wiper motor 6 and 7 continue to actuate the wiper blades 2 and 3.

Namely, the capacitor C1 maintains the transistor Tr2 in its ON-state after the wiper blade 2 departs from the stop position A1 (whereby power supply to the base of the transistor Tr2 from the power source terminal 200 is cut off) until another wiper blade 3 departs from the stop position B1 and the grounding circuit of the relay coil RL2-0 is formed completely by the movable contact 15a of the autostop switch 15, namely for a duration of period T3 (time t2-t4), and maintains the grounding circuit of the relay coil RL2-0 through the transistor Tr2 so as not to stop the wiper motor 7.

When the wiper blades 2 and 3 reciprocate from the stop positions A1 and B1 through the upper turning positions A2 and B2 by the actuation of the wiper motor 6 and 7, and arrive again at the stop positions A1 and B1 (lower turning positions), the movable contacts 14a and 15a of the autostop switches 14 and 15 come out contact with the grounded normal-opened fixed contacts 14c and 15c at time t5 and t6 respectively, and the electric potential at the both autostop switch terminals 12c and 12d of the controller 12 changes into the H-level at time t6. Whereby the electric potential at the port P6 of the integrated circuit IC18 changes into the H-level, and the charge of the capacitor C2 is temporarily started at time t6.

Although, the grounding circuits of the relay coils RL1-0 and RL2-0 through the movable contacts 14a and 15a of the autostop switches 14 and 15, and the diodes D3 and D4 are broken owing to the H-level potential at the autostop switch terminals 12c and 12d, the port P7 of the integrated circuit IC18 is maintained at the L-level potential since the condenser C2 is kept electric potential higher than the second threshold level Vth2 and the transistor Tr1 is maintained in the OFF-state. Therefore, an electric current from the power source terminal 200 flows to the resistor R2 and the capacitor C1 through the terminal 12h of the controller 12, the resistor R6, the node J and the diode D7, the capacitor C1 is charged instantly at time t6 and the transistor Tr2 is turned on. Accordingly, the grounding circuits of the relay coil RL1-0 and RL2-0 is formed through the transistor Tr2, and the wiper motors 6 and 7 continue to actuate the wiper blades 2 and 3.

Namely, the respective wiper blades 2 and 3 start the second wiping operation from the stop positions A1 and B1 (lower turning positions).

Figure 4:
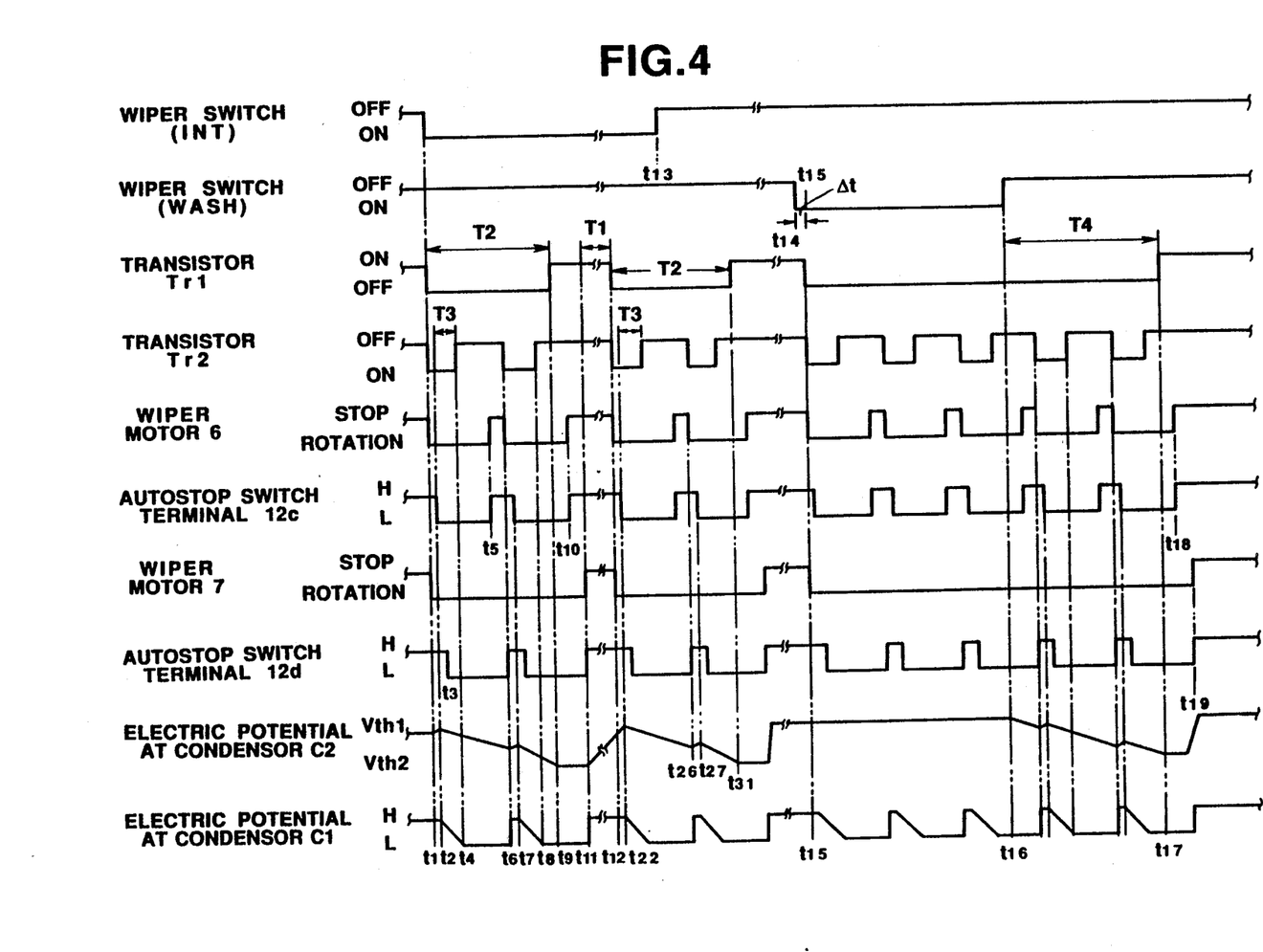
FIG. 4 is a time chart illustrating an operation of the wiper apparatus shown in FIG. 1.

In this case, if the wiper motor 6 actuate the wiper blade 2 faster than another wiper blade 3 and the wiper blade 2 arrives at the stop position A1 at time t5 before the wiper blade 3 arrives at the stop position B1 at time t6, the movable contact 14a of the autostop switch 14 disposed on the wiper motor 6 opens (H-level) and the electric potential at the autostop switch terminal 12c of the controller changes into the H-level previously to the autostop switch terminal 12d as shown in FIG. 4. Therefore, the grounding circuit of the relay coil RL1-0 of the relay RL1 opens, the relay coil RL1-0 is demagnetized and the traveling contact RL1-1 shifts to the fixed relay contact RL1-3 connected to the power source terminal 200 from the grounded fixed relay contact RL1-2, thereby stopping the wiper motor 6 and the wiper blade 2 stops at the stop position A1.

When the wiper blade 3 arrives at the stop position B1 at time t6 later than wiper blade 2, the movable contact 15a of the autostop switch 15 disposed on the wiper motor 7 opens (H-level), the grounding circuit of the relay coil RL2-0 of the relay RL2 opens and the traveling contact RL2-1 comes in contact with the fixed relay contact RL2-3 connected to the power source terminal 200 since the electric potential at the autostop switch terminal 12d of the controller 12 changes into the H-level. However, because the electric potential at both the autostop switch terminals 12c and 12d of the controller 12 changes into H-level the capacitor C1 is rapidly charged by applying H-level potential to the node J and the transistor Tr2 is turned on at time t6, the grounding circuits of the relay coils RL1-0 and RL2-0 of the relays RL1 and RL2 are formed through the transistor Tr2 and the relay coils RL1-0 and RL2-0 are excited, whereby the wiper motors 6 and 7 start simultaneously and the wiper blades 2 and 3 start the second wiping operation synchronously. In this time, the capacitor C2 connected to the port P3 of the integrated circuit IC18 is charged only when the electric potential at both the autostop switch terminals 12c and 12d of the controller 12 changes into the H-level and the electric potential at the port P6 is maintained in the H-level (time t6–t7), and begins to discharge again at time t7 at the same time the wiper motors 6 and 7 start to actuate the wiper blades 2 and 3, and the electric potential at the port P6 changes into the L-level owing to the L-level potential at one or both of the autostop switch terminals 12c and 12d. And the capacitor C1 is also charged only when both the autostop switch terminals 12c and 12d are maintained in the H-level, and discharged when the electric potential at one or both of them change into the L-level at time t7. Then the transistor Tr2 is turned off again at time t8.

When the respective wiper motors 6 and 7 actuate the wiper blades 2 and 3 in this manner and the wiper blades 2 and 3 return to the stop positions A1 and B1 after the second wiping operation, the capacitor C1 has finished discharging and the capacitor C2 also has discharged down to the predetermined second threshold level Vth2, so that the electric potential at port P7 of the integrated circuit IC18 has changed to the H-level and the transistor Tr1 has changed to the ON-state at time t9. Therefore, the grounding circuits of the relay coils RL1-0 and RL2-0 of the relays RL1 and RL2 open, the traveling contacts RL1-1 and RL1-2 shift to the fixed relay contacts RL1-3 and RL2-3 from the grounded fixed relay contacts RL1-2 and RL2-2, and the respective wiper motors 6 and 7 stop at time t10 and t11 because the transistor Tr2 is not turned on even when the wiper blades 2 and 3 arrive at the stop positions A1 and B1 at time t10 and t11, the movable contacts 14a and 15a come out contact with the grounded normal-opened fixed contacts 14c and 15c of the autostop switches 14 and 15 and the electric potential at both the autostop terminals 12c and 12d changes into the H-level.

When the wiper motors 6 and 7 stop after the second wiping operation of the wiper blades 2 and 3, and the electric potential at both the autostop terminals 12c and 12d changes into the H-level at time t11, the electric potential at the port P6 of the integrated circuit IC18 changes into the H-level, and the capacitor C2 is started again to be charged thereby changing the port P3 into the H-level potential. And intermittent time is defined as the time required for charging the capacitor C2 up to the predetermined electric potential, that is the first threshold level Vth1, the wiper motors 6 and 7 suspend for the intermittent time and the wiper blades 2 and 3 are so designed as to be stopped at the stops A1 and B1.

In due time, the electric potential at the port P7 of the integrated circuit IC18 changes into the L-level at the time t12 when the capacitor C2 is charged up to the first threshold level Vth1, the transistor Tr1 is turned off, thereby turning the transistor Tr2 on, and the wiper motors 6 and 7 start to actuate the wiper blades 2 and 3 similarly to the case of the first wiping operation. After this, such the wiping operation is repeated.

The capacitor C2 is charged continuously after time t12 and begins to be discharged at time t22. The discharge of the capacitor C2 continues until time t26, the capacitor C2 is charged again at time t26–t27 and discharged again at time t27–t31. Namely the capacitor C2 is charged at time t12–t22 and time t26–t27 for a duration of period T2 (time t12–t31).

In the intermittent mode, the port P3 of the integrated circuit IC18 changes into the L-level potential and the capacitor C2 is discharged when the electric potential at either autostop switch terminal 12c or 12d changes into the L-level and the electric potential at the port P6 of the integrated circuit IC18 changed into the L-level, and changes into the H-level potential and the capacitor C2 is charged up to the predetermined electric potential by taking time depending on the variable resistor R15 connected to the port P4 of the integrated circuit IC18 when the H-level potential is applied to both autostop switch terminals 12c and 12e.

The port P7 of the integrated circuit IC18 changes into the L-level potential from the H-level and the transistor Tr1 changes into the ON-state when the capacitor C2 is discharged down to the second threshold level Vth2.

Namely, ON-state time of the transistor Tr1 which defines the working time of the second timer circuit founds upon the output signal of the port P7 of the integrated circuit IC18, and an ON-signal output from the port P7 is defined according to the electric potential at the port P3 of the integrated circuit IC18, in other words according to the time required for charging and discharging the condenser C2 to the first or second threshold level (Vth1 or Vth2). Accordingly, it is also possible to reciprocate the wiper blades 2 and 3 more than two times by regulating the variable resistor R15 which is connected to the port P4 of the integrated circuit IC18.

By an off-operation of the wiper switch 13 at time t13, the port P2 of the integrated circuit IC18 changes into the H-level potential and the electric current flowing to the capacitor C2 from the port P3 is shut off. If the electric potential of the capacitor C2 at this moment is higher than the second threshold level Vth2, the port P7 is maintained in the L-level potential and the transistor Tr1 is kept in the OFF-state, and the transistor Tr2 is maintained in the ON-state even when the wiper blades 2 and 3 arrive at the stop positions A1 and B1. The wiper motors 6 and 7 continue to actuate the wiper blades 2 and 3 because the grounding circuits of the relay coils RL1-0 and RL2-0 of the relays RL1 and RL2 are formed. The wiper blades 2 and 3 repeat the reciprocative wiping operation once again. Then, the wiper motors 6 and 7 stop when the wiper blades 2 and 3 return to the stop positions A1 and B1 after the electric potential of the capacitor C2 falls lower than the second threshold level Vth2 and the transistor Tr1 is turned on.

In a case the electric potential of the capacitor C2 is lower than the second threshold level Vth2, the electric potential at the port P7 changes into the H-level and the transistor Tr1 is turned on, therefore the grounding circuit of the relay coils RL1-0 and RL2-0 through the transistor Tr2 are not formed and, the wiper motors 6 and 7 stop and the wiper blades 2 and 3 stop when the wiper blades 2 and 3 arrive at the stop positions A1 and B1 and the grounding circuits of the relay coils RL1-0 and RL2-0 through the movable contacts 14a and 15a of the autostop switches 14 and 15 break.

In a case where the wiper switch 13 is switched off during the intermittent time of the wiper blades 2 and 3, the wiper blades 2 and 3 remain at the stop positions A1 and B1 as they are because the capacitor C2 is charged quickly up to the first threshold level Vth1, but the transistor Tr1 is in the ON-state.

Namely, the wiper blade 2 and 3 so designed as to stop at the stop positions A1 and B1 as they are, or at the time when they arrive at the stop positions A1 and B1 at next time or at next time but one after repeating the wiping operation once again according to the electric potential of the condenser C2 at the time of switching off the wiper switch 13.

In a case where the wiper switch 13 switched into a washer position (WASH) at time t14, the grounding circuit of the washer motor 11 is formed through the wiper switch 13 and the washer motor 11 works, thereby spraying washing fluid stored in the reservoir 10 toward the window glasses 62 and 63. And the electric potential at the port 1 of the integrated circuit IC18 changes into L-level, and the port P7 changes into the L-level potential at time t15 after the lapse of delay time Δt defined by the delaying circuit composed of the capacitor C5, the resistors R17 and R18.

Whereby the transistor Tr1 is turned off and the transistor Tr2 is turned on, the respective wiper motors 6 and 7 actuate the wiper blades 2 and 3 similarly to above and the window glasses 62 and 63 are wiped.

The port P3 of the integrated circuit IC18 is maintained in the H-level potential only when the wiper switch 13 is been operating in the washer position (WASH), and when the wiper switch 13 is switched off from the washer position (WASH) at time t16, the electric potential at the port P1 of the integrated circuit IC18 changes into the H-level and the capacitor C2 connected to the port P3 is charged and discharged according to the electric potential at the port P6.

Therefore, the capacitor C2 starts discharging and the fourth timer circuit maintains the transistor Tr1 in the OFF-state until the capacitor C2 is discharged down to the second threshold level Vth2 at time t17, for a duration of period T4, and the wiper motors 6 and 7 continue to actuate the wiper blades 2 and 3, thereby wiping the window glasses 62 and 63 for the predetermined time similarly to the second timer circuit mentioned above. And when the predetermined time T4 elapses after switching off the wiper switch 13 at time t16 and the capacitor C2 is discharged down to the second threshold level Vth2, the electric potential at the port P7 of the integrated circuit IC18 changes into the H-level at time t17 and the transistor Tr1 is turned on, thereby breaking the grounding circuits of the relay coils RL1-0 and RL2-0 of the relays RL1 and RL2 through the transistor Tr2. Accordingly, the wiper motors 6 and 7 stop when the wiper blades 2 and 3 arrive at the stop position A1 and B1 and the movable contacts 14a and 15a of the autostop switches 14 and 15 open at time t18 and t19, respectively.

As explained above, in the wiper apparatus according to this invention, having the afore-mentioned construction, it is possible to wipe the windshield or the rear window of the motor vehicle more than two times in a case the intermittent mode is selected, and possible to wipe out raindrops and extraneous matters completely. An excellent effect can be obtained since it is possible to obtain a wide range of view for driving the motor vehicle safely.

What is claimed is:

1. A wiper apparatus for wiping on the windshield of a vehicle with a plurality of wiper motors and a plurality of wiper blades operated by the wiper motors comprising:

intermittent switch means for generating an intermittent signal;

a first wiper motor having a first cooperating switch operated with rotation thereof;

a second wiper motor having a second cooperating switch operated with rotation thereof;

a first relay connected with said first wiper motor and the first cooperating switch of said first wiper motor for operating said first wiper motor while the first cooperating switch of said first wiper motor is in an ON-state;

a second relay connected with said second wiper motor and the second cooperating switch of said second wiper motor for operating said second wiper motor while the second cooperating switch of said second wiper motor is in an ON-state;

relay driving means connected with said first and second relays and the first and second cooperating switches of said first and second wiper motors for driving said first and second relays;

first timer means connected with the first and second cooperating switches of the first and second wiper motors and responsive to OFF-states of the first and second cooperating switches of said first and second wiper motors for generating a first timer signal with a predetermined time duration of intermittent time(T1);

second timer means connected with said intermittent switch means, said first timer means and the first and second cooperating switches of said first and second wiper motors and responsive to the intermittent signal generated from said intermittent switch means, the ending edge of the first timer signal of said first timer means and states of the first and second cooperating switches of said first and second wiper motors for generating a second timer signal a time duration (T2:T2<T1) of which is determined longer than time required for the wiper blade to go and return back, said second timer means counting up in response to the OFF-states of the first and second cooperating switches of said first and second wiper motors and counting down in response to an ON-state of either first or second cooperating switch of said first or second wiper motor;

third timer means connected with the first and second cooperating switches of said first and second wiper motors and responsive to the ON-state of either first or second cooperating switch of said first or second wiper motor for generating a third timer signal with predetermined time duration (T3:T3<T2), said third timer means being connected with said relay driving means for holding the relay driving means in operating condition during the time duration (T3); and prohibiting means connected with said first and second timer means and said relay driving means for forbidding the operation of said relay driving means while the first timer signal generated in said first timer means is supplied thereto and for permitting the operation of said relay driving means while the second timer signal generated in said second timer means is supplied thereto.

2. A wiper apparatus according to claim 1, wherein said first and second timer means have a charging and discharging circuit having a common capacitor.

3. A wiper apparatus according to claim 1, wherein said wiper apparatus further comprises:

washer switch means for generating a washer signal;

a washer motor connected to said washer switch means;

a delaying circuit connected to said washer switch means and said prohibiting means, and responsive to the washer signal from said washer switch means for generating a delayed washer signal and for supplying the delayed washer signal to said prohibiting means to permit the operation of said relay driving means; and fourth timer means connected with said washer switch means and the first and second cooperating switches of said first and second wiper motors, and responsive to the ending edge of the washer signal generated from said washer switch means and states of the first and second cooperating switches of said first and second wiper motors for generating a fourth timer signal with a predetermined time duration (T4:T2≦T4<T1) and for supplying the fourth timer signal to said prohibiting means to permit the operation of said relay driving means, said fourth timer means counting up in response to the OFF-states of the first and second cooperating switches of said first and second wiper motors and counting down in response to the ON-state of either first or second cooperating switch of said first or second wiper motor.

4. A wiper apparatus according to claim 3, wherein said first and second timer means have a charging and discharging circuit having a common capacitor.

5. A wiper apparatus according to claim 3, wherein said second and fourth timer means are substantially identical.

6. A wiper apparatus for wiping on the windshield of a vehicle with a plurality of wiper motors and a plurality of wiper blades operated by the wiper motors comprising:

intermittent switch means for generating an intermittent signal;

a first wiper motor having a first position detecting switch operated with rotation thereof;

a second wiper motor having a second position detecting switch operated with rotation thereof;

motor driving means connected with said first wiper motor for operating said first wiper motor while the first position detecting switch of said first wiper motor being in an ON-state and connected with said second wiper motor for operating said second wiper motor while the second position detecting switch of said second wiper motor being in an ON-state;

first timer means having a charging circuit with a capacitor and connected with the first and second position detecting switches of said first and second wiper motors and responsive to OFF-states of the first and second position detecting switches of said first and second wiper motors for generating a first timer signal with a predetermined time duration of intermittent time(T1);

second timer means having a discharging circuit including the capacitor of said first timer means and connected with said intermittent switch means, said first timer means and the first and second position detecting switches of said first and second wiper motors and responsive to the intermittent signal generated from said intermittent switch means, the ending edge of the first timer signal of said first timer means and states of the first and second position detecting switches of said first and second wiper motors for generating a second timer signal a time duration (T2:T2<T1) of which is determined longer than time required for the wiper blade to go and return back, said second timer means charging the capacitor in response to the OFF-states of the first and second position detecting switches of said first and second wiper motors and discharging the capacitor in response to the ON-state of either first or second position detecting switch of said first or second wiper motor;

third timer means connected with the first and second position detecting switches of said first and second wiper motors and responsive to the ON-state of either first or second position detecting switch of said first or second wiper motor for generating a third timer signal with predetermined time duration (T3:T3<T2), said third timer means being connected to said motor driving means for holding the motor driving means in operating condition during the time duration (T3); and prohibiting means connected with said first and second timer means and said motor driving means for forbidding the operation of said motor driving means while the first timer signal generated in said first timer means is supplied thereto and for permitting the operation of said motor driving means while the second timer signal generated in said second timer means is supplied thereto.

7. A wiper apparatus for wiping on the windshield of a vehicle with a plurality of wiper motors and a plurality of wiper blades operated by the wiper motors comprising:

intermittent switch means for generating an intermittent signal;

- a first wiper motor having a first cooperating switch operated with rotation thereof;

a second wiper motor having a second cooperating switch operated with rotation thereof;

a first relay connected with said first wiper motor and the first cooperating switch of said first wiper motor for operating said first wiper motor while the first cooperating switch of said first wiper motor is in an ON-state;

a second relay connected with said second wiper motor and the second cooperating switch of said second wiper motor for operating said second wiper motor while the second cooperating switch of said second wiper motor is in an ON-state;

relay driving means connected with said first and second relays and the first and second cooperating switches of said first and second wiper motors for driving said first and second relays;

first timer means having a charging circuit with a capacitor and connected with the first and second cooperating switches of the first and second wiper motors and responsive to OFF-states of the first and second cooperating switches of said first and second wiper motors for generating a first timer signal with a predetermined time duration of intermittent time (T1);

second timer means having a discharging circuit with the capacitor of said first timer means and connected with said intermittent switch means, and first timer means and the first and second cooperating switches of said first and second wiper motors and responsive to the intermittent signal generated from said intermittent switch means, the ending edge of the first timer signal of said first timer means and states of the first and second cooperating switches of said first and second wiper motors for generating a second timer signal a time duration (T2:T2<T1) of which is determined longer than time required for the wiper blade to go and return back, said second timer means charging the capacitor in response to the OFF-states of the first and second cooperating switches of said first and second wiper motors and discharging the capacitor in response to the ON-state of either first or second cooperating switch of said first or second wiper motor;

third timer means connected with the first and second cooperating switches of said first and second wiper motors and responsive to the ON-state of either first or second cooperating switch of said first or second wiper motor for generating a third timer signal with predetermined time duration (T3:T3<T2), said third timer means being connected with said relay driving means for holding the relay driving means in operating condition during the time duration (T3); and prohibiting means connected with said first and second timer means and said relay driving means for forbidding the operation of said relay driving means while the first timer signal generated in said first timer means is supplied thereto and for permitting the operation of said relay driving means while the second timer signal generated in said second timer means is supplied thereto.

* * * * *